W. B. Wadsworth,
Windlass Water Elevator,
No. 3,057. Reissued July 28, 1868.
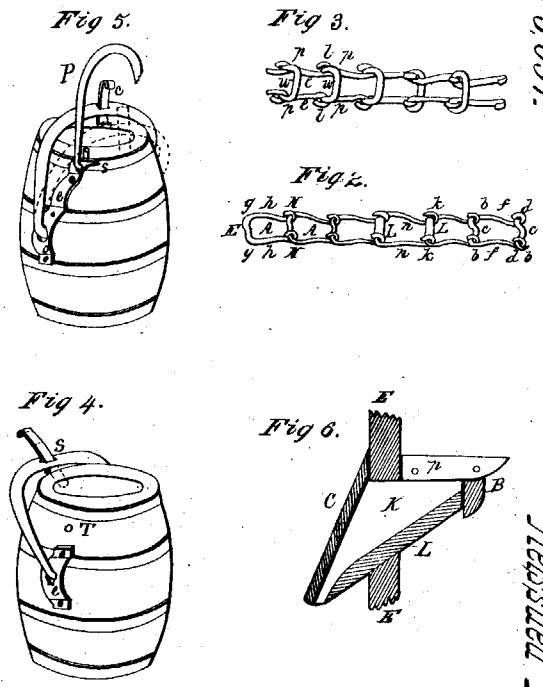
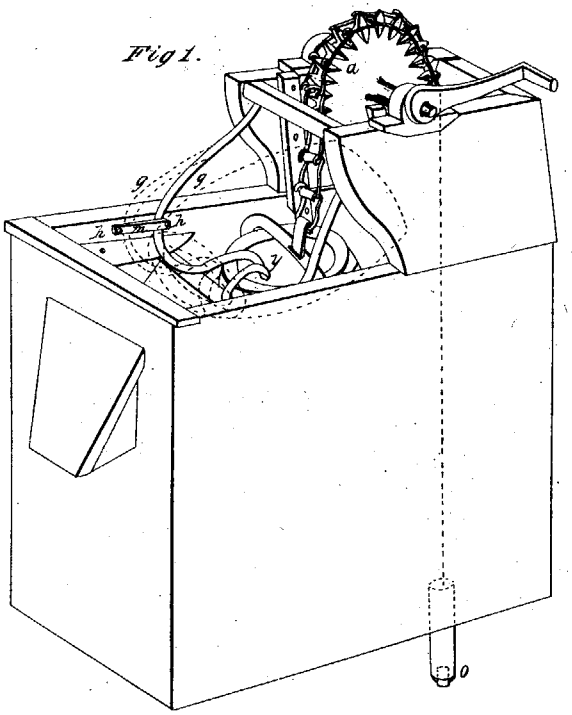
Witnesses.
P. J. Cobb
A. C. Cobb
Inventor.
W. B. Wadsworth
N. PETERS, PHOTO-LITHOGRAPHER, WASHINGTON, D. C.

UNITED STATES PATENT OFFICE.

W. B. WADSWORTH, OF CLEVELAND, OHIO.

IMPROVEMENT IN WATER-ELEVATORS.

Specification forming part of Letters Patent No. 37,535, dated January 27, 1863; Reissue No. 3,057, dated July 28, 1868.

*To all whom it may concern:*

Be it known that I, WM. B. WADSWORTH, of Cleveland, in Cuyahoga county, in the State of Ohio, have invented a new and useful Improvement in Water-Elevators for Raising Water from Wells and Cisterns, &c.; and I do hereby declare that the following is a full and exact description thereof, reference being had to the accompanying drawings and letters of reference marked thereon, in which—

Figure 1 is a perspective view of the machine in operation. Figs. 2 and 3 show chains that are applicable. Fig. 4 shows a bucket with a stop to prevent it from tilting back.

In constructing I make a curb and mount it with a wheel and shaft, substantially as shown at *a*, Fig. 1, the teeth of the wheel being made slim and the bearings for the chain small, to attract but little water from the wet chain, and thus prevent obstruction by ice.

The chain is made of wire links, as shown at *c b b f f d d*, Fig. 2. The chain is put over the wheel *a*, and bucket on one side and counter-balance on the other. The bail is hinged near the center of the bucket. An iron bottom is preferred.

What I claim as new is—

The chain composed of links, as shown at *c b b f f d d*, the bent cross-bar *c*, running through to the outside of the hooks of the last link to *b b*, then angling, as shown at *f f*, to hooks *d d*, inside of bends *b b*, substantially as shown and described.

W. B. WADSWORTH.

Witnesses:
J. D. PATTEN,
R. H. WHITTLESEY.